(12) United States Patent
Taniguchi et al.

(10) Patent No.: US 7,949,151 B2
(45) Date of Patent: May 24, 2011

(54) VEHICLE SURROUNDINGS MONITORING APPARATUS

(75) Inventors: Fuminori Taniguchi, Saitama (JP); Hiroyuki Koike, Saitama (JP); Masakazu Saka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1024 days.

(21) Appl. No.: 11/799,963

(22) Filed: May 3, 2007

(65) Prior Publication Data

US 2008/0130954 A1 Jun. 5, 2008

(51) Int. Cl.
*G06K 9/00* (2006.01)
(52) U.S. Cl. ......................................... 382/104; 382/103
(58) Field of Classification Search .................... 382/104
See application file for complete search history.

(56) References Cited

U.S. PATENT DOCUMENTS

| 7,330,568 | B2 | 2/2008 | Nagaoka et al. | |
|---|---|---|---|---|
| 7,447,334 | B1 | 11/2008 | Jiang et al. | |
| 2004/0183906 | A1* | 9/2004 | Nagaoka et al. | 348/148 |
| 2005/0157929 | A1 | 7/2005 | Ogasawara | |

FOREIGN PATENT DOCUMENTS

| DE | 101 48 071 (A1) | 4/2003 |
|---|---|---|
| DE | 10 2004 012 811 A1 | 11/2004 |
| JP | 11-328364 | 11/1999 |
| JP | 2001-006096 | 1/2001 |
| JP | 2002-312769 | 10/2002 |
| JP | 2004-295798 | 10/2004 |

OTHER PUBLICATIONS

Shinohara et al: English Machine Translation for JP 2002-312769.*
"Rentierlaterne Aus Alufolie" Adventkalender-2004, http://www.hscincin.musin.de/G-Mitmachen/G-1-Aktion%20des%20Monats/Adventkalender-2004/Tag-08/Rentierlaterne-Anleitung.doc.
Rigney et al., "Investigation of Animal Detection for Traffic Accident Mitigation", Southwest Research Institution, pp. 1-2.

* cited by examiner

*Primary Examiner* — Samir A Ahmed
*Assistant Examiner* — Ruiping Li
(74) *Attorney, Agent, or Firm* — Carrier Blackman & Associates, P.C.; Joseph P. Carrier; William D. Blackman

(57) ABSTRACT

A vehicle surroundings monitoring apparatus is provided herein which is capable of determining an object type, particularly capable of determining an animal other than a human being among objects. The vehicle surroundings monitoring apparatus which monitors the surroundings of a vehicle by using an image captured by a camera (2R, 2L) mounted on the vehicle, including an object extraction process unit which extracts an image area of the object from the captured image (steps 1 to 6) and an object type determination process unit which determines the object type according to whether the image area of the object extracted by the object extraction process unit includes a first object area in which the ratio of widths in different directions is within a predetermined range and a plurality of second object areas located below the first object area and smaller in area than the first object area (steps 31 to 37).

6 Claims, 8 Drawing Sheets

VEHICLE SURROUNDINGS MONITORING APPARATUS

BACKGROUND OF THE INVENTION

1. Field of the Invention

The present invention relates to a vehicle surroundings monitoring apparatus which recognizes an object affecting the traveling of a subject vehicle.

2. Description of the Related Art

Conventionally, as this type of vehicle surroundings monitoring apparatus, there has been suggested a display processor which extracts an image area of a pedestrian likely to come in contact with a subject vehicle from an image of the surroundings of the vehicle captured by an infrared camera and visually provides the information to a driver of the vehicle (for example, refer to Japanese Patent Laid-Open No. Hei11 (1999)-328364). This apparatus binarizes the captured infrared image to find out a high-luminance area and determines the high-luminance area to be a pedestrian's head if the centroid position, area ratio, net area and the like of the high-luminance area satisfy predetermined head determination conditions. After determining the area of the pedestrian's head, it then sets an area including a pedestrian's body and displays these areas separated from other areas. Thereby, the position of the pedestrian's entire body is identified in the captured infrared image, and the information is displayed to the vehicle driver as a visual aid therefor.

An object existing around the vehicle and likely to come in contact with the vehicle, however, is not limited to a pedestrian. For example, a large animal such as a deer may exist on a road and come in contact with the vehicle. In this situation, the large animal is not determined to be a pedestrian under the above determination conditions based on the centroid position, area ratio, net area and the like of the high-luminance area. Therefore, the apparatus has such a disadvantage that information on the large animal is not presented to the vehicle driver as information calling attention to it, though the large animal is likely to come in contact with the vehicle.

SUMMARY OF THE INVENTION

In view of the above problem, it is an object of the present invention to provide a vehicle surroundings monitoring apparatus capable of determining an object type, and particularly a vehicle surroundings monitoring apparatus capable of determining an animal other than a human being among objects.

In order to achieve the above object, according to one aspect of the present invention, there is provided a vehicle surroundings monitoring apparatus which monitors the surroundings of a vehicle by using an image captured by a camera mounted on the vehicle, comprising: an object extraction process unit which extracts an image area of an object from the image captured by the camera; and an object type determination process unit which determines an object type according to whether the image area of the object extracted by the object extraction process unit includes a first object area in which the ratio of widths in different directions is within a predetermined range and a plurality of second object areas located below the first object area and smaller in area than the first object area.

Generally, if the object is an animal, the animal has a first object area corresponding to the body and two or more second object areas corresponding to legs. Furthermore, the shape of the body depends on the type of animal. Therefore, the vehicle surroundings monitoring apparatus according to the present invention determines the object type by means of the object type determination process unit under the condition that the image area of the object includes the first object area in which the ratio of widths in different directions is within the predetermined range and the plurality of second object areas located below the first object area and smaller in area than the first object area. Thereby, it is possible to determine whether the object type is an animal having the body of the shape in which the ratio of widths in different directions is within a predetermined range.

Furthermore, in the vehicle surroundings monitoring apparatus according to the present invention, preferably the object type determination process unit determines that the object type is an animal other than a human being in the case where the image area of the object extracted by the object extraction process unit includes the first object area in which the ratio of widths in different directions is within the predetermined range and the plurality of second object areas located below the first object area and smaller in area than the first object area.

According to the vehicle surroundings monitoring apparatus of the present invention, the object type determination process unit determines whether the object is an animal other than a human being under the condition that the image area of the object includes the first object area in which the ratio of widths in different directions is within the predetermined range and the plurality of second object areas located below the first object area and smaller in area than the first object area. Thereby, it is possible to determine whether the object is an animal other than a human being, as distinguished from a signboard in which the ratio of widths in different directions is not within the predetermined range and a sign or the like that has only one second object area.

Furthermore, in the vehicle surroundings monitoring apparatus according to the present invention, preferably the first object area further has a predetermined size.

Generally, the size of the first object area corresponding to the body depends on the kind of animal. Therefore, the object type determination process unit determines the object type under the condition that the image area includes the first object area having the predetermined size in addition to that the ratio of widths in different directions is within the predetermined range. Thereby, the object type can be determined more accurately.

Furthermore, in the vehicle surroundings monitoring apparatus according to the present invention, preferably the object type determination process unit determines the object type based on the relationship between a first area width which is the horizontal width of the image captured by the camera of the first object area and a second area width which is the horizontal width of the image captured by the camera between the left end on the left side and the right end on the right side of the two or more second object areas.

Generally, the relationship between the first area width corresponding to the width of an animal's body and the second area width corresponding to the width between animal's legs depends on the kind of animal. Therefore, the object type determination process unit according to the present invention determines the object type based on the relationship between the first area width and the second area width. Thereby, it is possible to determine whether the object type is an animal satisfying the predetermined relationship between the first area width and the second area width.

Furthermore, in the vehicle surroundings monitoring apparatus according to the present invention, preferably the object type determination process unit determines that the object type is an animal other than a human being in the case where the second area width is greater than one half of the first area width.

Generally, if the object is an animal other than a human being, the animal moves while supporting the body. Therefore, the second area width corresponding to the width between the front and hind legs is thought to be greater than one half of the first area width corresponding to the width of the body. Therefore, according to the vehicle surroundings monitoring apparatus of the present invention, the object type determination process unit can determine the object to be an animal other than a human being if the second area width is greater than one half of the first area width.

Furthermore, preferably the vehicle surroundings monitoring apparatus according to the present invention further comprises a distance calculation process unit which calculates a distance of a real space position corresponding to the image area included in the image captured by the camera from the vehicle, wherein the object type determination process unit determines the object type under the condition that the image area of the object has a feature located within a predetermined range from the first object area in the image captured by the camera and satisfying a preset feature condition and that the distance of the real space position corresponding to the feature from the vehicle is equal to the distance of the real space position corresponding to the first object area from the vehicle.

Generally, if the object is an animal, there are parts of the body such as the head and tail around the first object area and these parts have features peculiar to them, respectively. Therefore, in the vehicle surroundings monitoring apparatus of the present invention, the feature conditions corresponding to the peculiar features are previously set. Then, the object type determination process unit determines the object type under the condition that the image area of the object has the feature located within the predetermined range from the first object area in the captured image and satisfying the feature condition and that the distance of the real space position corresponding to the feature from the vehicle is equal to the distance of the real space position corresponding to the first object area from the vehicle. Thereby, the object type can be determined more accurately as distinguished from a signboard or the like that does not have the above feature around the first object area.

According to another aspect of the present invention, there is provided a vehicle surroundings monitoring apparatus which monitors the surroundings of a vehicle by using a computer which is provided in the apparatus and includes an interface circuit for use in accessing an image captured by a camera mounted on the vehicle, wherein the computer performs: an object extraction process for extracting an image area of an object from the image captured by the camera; and an object type determination process for determining an object type according to whether the image area of the object extracted in the object extraction process includes a first object area in which the ratio of widths in different directions is within a predetermined range and a plurality of second object areas located below the first object area and smaller in area than the first object area.

According to the vehicle surroundings monitoring apparatus of the present invention, the computer performs the object extraction process to extract the image area of the object from the image and performs the object type determination process to determine the object type under the condition that the extracted image area includes the first object area in which the ratio of widths in different directions is within the predetermined range and the plurality of second object areas located below the first object area and smaller in area than the first object area. Thereby, it is possible to determine whether the object type is an animal having the body of the shape in which the ratio of widths in different directions is within the predetermined range.

According to still another aspect of the present invention to achieve the above object, there is provided a vehicle equipped with the vehicle surroundings monitoring apparatus.

According to the vehicle of the present invention, the vehicle surroundings monitoring apparatus determines the object type under the condition that the image area of the object includes the first object area in which the ratio of widths in different directions is within the predetermined range and the plurality of second object areas located below the first object area and smaller in area than the first object area. Thereby, it is possible to determine whether the object type is an animal having the body of the shape in which the ratio of widths in different directions is within the predetermined range.

According to still another aspect of the present invention to achieve the above object, there is provided a vehicle surroundings monitoring program which causes an in-vehicle computer including a processing unit which accesses data of an image captured by a camera mounted on a vehicle to perform a function of monitoring the surroundings of the vehicle, the program causing the computer to function as: an object extraction process unit which extracts an image area of an object from the image captured by the camera; and an object type determination process unit which determines an object type according to whether the image area of the object extracted by the object extraction process unit includes a first object area in which the ratio of widths in different directions is within a predetermined range and a plurality of second object areas located below the first object area and smaller in area than the first object area.

The vehicle surroundings monitoring program according to the present invention is executed on the computer to extract the image area of the object from the captured image by means of the object extraction process unit. Thereafter, the object type determination process unit determines the object type under the condition that the extracted image area includes the first object area in which the ratio of widths in different directions is within the predetermined range and the plurality of second object areas located below the first object area and smaller in area than the first object area. Thereby, it is possible to determine whether the object type is an animal having the body of the shape in which the ratio of widths in different directions is within the predetermined range.

According to still another aspect of the present invention to achieve the above object, there is provided a vehicle surroundings monitoring method of monitoring the surroundings of a vehicle by using an in-vehicle computer including a processing unit which accesses data of an image captured by a camera mounted on the vehicle, the method comprising: an object extraction step of causing the computer to extract the image area of an object from the image captured by the camera; and an object type determination step of causing the computer to determine an object type according to whether the image area of the object extracted in the object extraction step includes a first object area in which the ratio of widths in different directions is within a predetermined range and a plurality of second object areas located below the first object area and smaller in area than the first object area.

According to the vehicle surroundings monitoring method of the present invention, the computer extracts the image area of the object from the captured image in the object extraction step and determines the object type under the condition that the image area of the object extracted in the object extraction step includes the first object area in which the ratio of widths in different directions is within the predetermined range and the plurality of second object areas located below the first object area and smaller in area than the first object area. Thereby, it is possible to determine whether the object type is an animal having the body of the shape in which the ratio of widths in different directions is within the predetermined range.

DETAILED DESCRIPTION OF THE PREFERRED EMBODIMENTS

One embodiment of the present invention will be described below with reference to FIG. 1 to FIG. 7.

Figure 1:
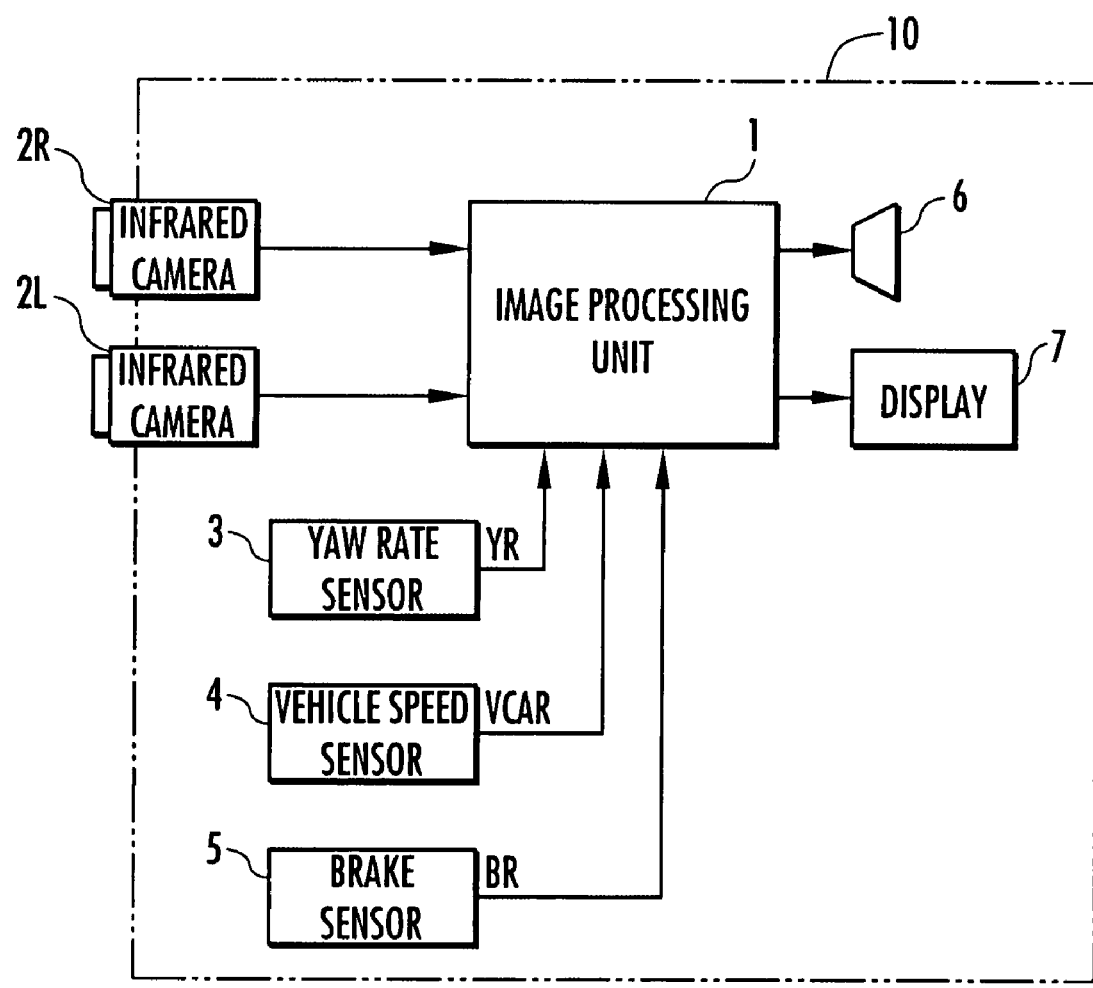
FIG. 1 is a diagram showing the overall configuration of one embodiment of a vehicle surroundings monitoring apparatus according to the present invention.
Figure 2:
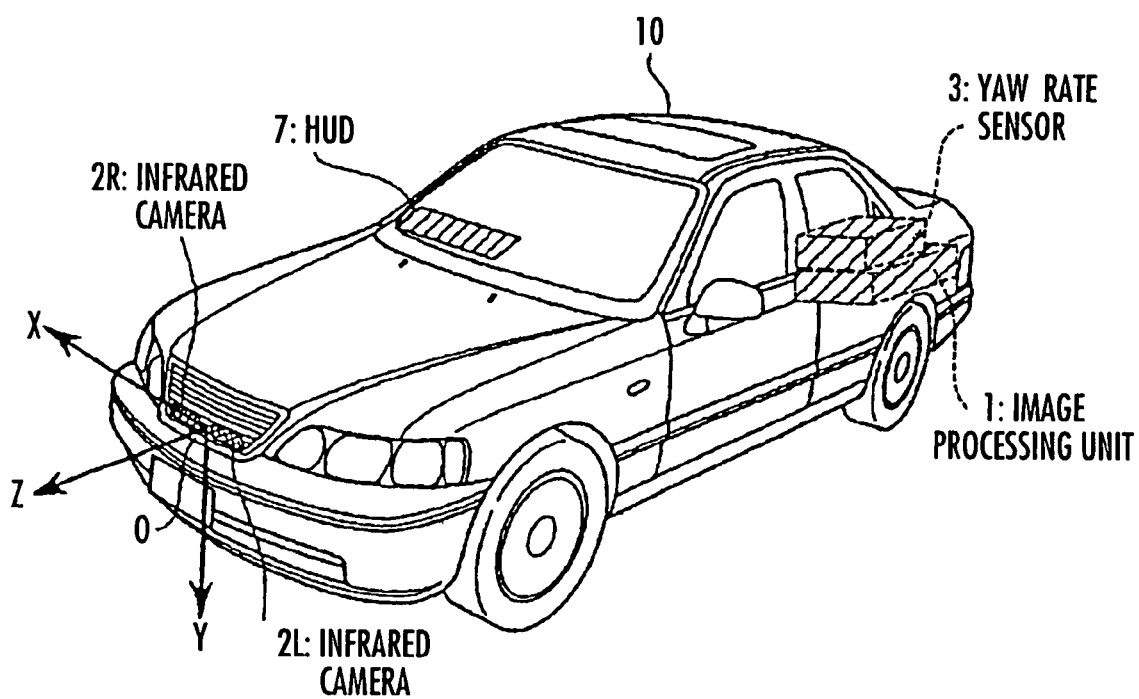
FIG. 2 is a perspective diagram of a vehicle equipped with the vehicle surroundings monitoring apparatus shown in FIG. 1.

First, the system configuration of a vehicle surroundings monitoring apparatus of this embodiment will be described with reference to FIG. 1 and FIG. 2. FIG. 1 is a block diagram showing the overall configuration of the vehicle surroundings monitoring apparatus and FIG. 2 is a perspective diagram showing the appearance of a vehicle (subject vehicle) equipped with the vehicle surroundings monitoring apparatus. In FIG. 2, partial components of the vehicle surroundings monitoring apparatus are not shown.

Referring to FIG. 1 and FIG. 2, the vehicle surroundings monitoring apparatus according to this embodiment includes an image processing unit 1. The image processing unit 1 is connected to two infrared cameras 2R and 2L which capture images in front of the vehicle 10 and is connected to a yaw rate sensor 3 which detects a yaw rate of the vehicle 10 as a sensor which detects the running condition of the vehicle 10, a vehicle speed sensor 4 which detects a traveling speed (vehicle speed) of the vehicle 10, and a brake sensor 5 which detects whether a brake of the vehicle 10 is operated. Furthermore, the image processing unit 1 is connected to a loudspeaker 6 for use in outputting audible information calling attention with voice or the like and to a display 7 for use in displaying images captured by the infrared cameras 2R and 2L and visual information calling attention. The infrared cameras 2R and 2L correspond to the cameras in the present invention.

Although detailed illustration is not shown here, the image processing unit 1 is composed of an electronic circuit including an A/D converter, a microcomputer (having a CPU, RAM, ROM and the like), and an image memory. Analog signals output from the infrared cameras 2R and 2L, the yaw rate sensor 3, the vehicle speed sensor 4, and the brake sensor 5 are converted to digital data by the A/D converter and input to the microcomputer. Thereafter, the microcomputer detects an object such as a human being (a pedestrian or a person on a bicycle) based on the input data, and if the detected object satisfies predetermined requirements for calling attention, it performs processing for calling driver's attention to the object by means of the loudspeaker 6 or the display 7. For example, the image processing unit 1 has an image input circuit, which converts analog video signals output from the infrared cameras 2R and 2L to digital data and stores it into an image memory, and an interface circuit, which accesses (reads and writes) the image data stored into the image memory, to perform various arithmetic processes for the image in front of the vehicle stored into the image memory.

The image processing unit 1 has the functions of an object extraction process unit, an object type determination process unit, and a distance calculation process unit in the present invention. By causing the microcomputer to execute the vehicle surroundings monitoring program according to the present invention, the microcomputer functions as the object extraction process unit and the object type determination process unit of the present invention. Furthermore, by causing the microcomputer to function as the object extraction process unit and the object type determination process unit, the microcomputer performs the object extraction step and the object type determination step in the vehicle surroundings monitoring method according to the present invention.

As shown in FIG. 2, the infrared cameras 2R and 2L are mounted on the front part (the part of a front grille in FIG. 2) of the vehicle 10 to capture images in front of the vehicle 10. In this instance, the infrared cameras 2R and 2L are located on the right side and the left side of the center of the vehicle 10 in the vehicle width direction, respectively. These locations are symmetric with respect to the center of the vehicle 10 in the vehicle width direction. The infrared cameras 2R and 2L are fixed to the front part of the vehicle 10 in such a way that the optical axes of the infrared cameras 2R and 2L are extending parallel to each other in the anteroposterior direction of the vehicle 10 and that the optical axes are at the same height from the road surface. The infrared cameras 2R and 2L have sensitivities in the far-infrared region. These infrared cameras 2R and 2L each have a characteristic that the higher the temperature of a material body captured by the infrared camera is, the higher the level of the output video signal is (the luminance of the video signal is higher).

In this embodiment, there is provided, as the display 7, a head up display 7a (hereinafter, referred to as the HUD 7a) which displays image information on the front window of the vehicle 10. It is possible to use, as the display 7, a display integrally mounted on a meter which displays the running condition such as a vehicle speed of the vehicle 10 or a display provided in an in-vehicle navigation system, instead of the HUD 7a or together with the HUD 7a.

Figure 3:
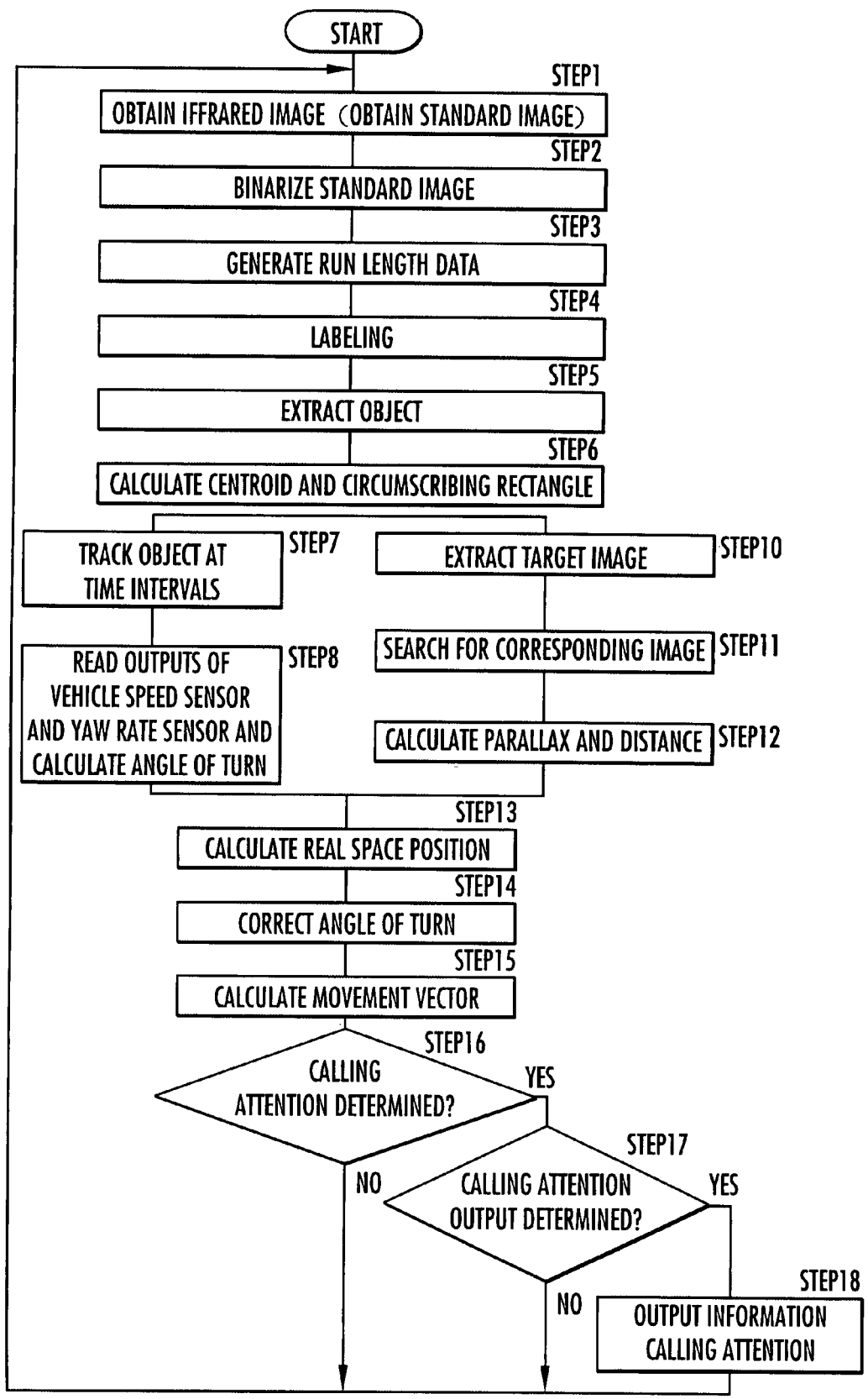
FIG. 3 is a flowchart showing the processing of the image processing unit provided in the vehicle surroundings monitoring apparatus shown in FIG. 1.

Subsequently, the overall operation of the vehicle surroundings monitoring apparatus of this embodiment will be described with reference to the flowchart shown in FIG. 3. Many of the processes in the flowchart shown in FIG. 3 are the same as, for example, those in FIG. 3 disclosed in Japanese Patent Laid-Open No. 2001-6096 by the present applicant, and therefore detailed description of the same processes is omitted in this specification.

First, the image processing unit 1 obtains infrared images captured by the infrared cameras 2R and 2L (step 1). The captured infrared images are grayscale images obtained by A/D-converting the infrared images which are output signals from the infrared cameras 2R and 2L and they are stored into the image memory. Hereinafter, the image obtained by the infrared camera 2R and the image obtained by the infrared camera 2L are referred to as the right image and the left image, respectively, and particularly the right image is referred to as the standard image. Although the standard image is the right image in this embodiment, it can be the left image.

Subsequently, the image processing unit 1 binarizes the standard image (right image) (step 2). The binarization is a process of comparing a luminance value of each pixel of the standard image with a predetermined luminance threshold value and setting a value of "1" (white) for an area having a high luminance value equal to or higher than the predetermined luminance threshold value (relatively bright area) and setting a value of "0" (black) for an area having a low luminance value lower than the luminance threshold value (relatively dark area) for the standard image. Hereinafter, the image (black and white image) obtained by the binarization will be referred to as the binary image. The area set to "1" in the binary image is referred to as the high-luminance area. The binary image is stored into the image memory separately from the grayscale image (the right image and the left image).

Subsequently, the image processing unit 1 performs the processing of steps 3 to 5 for the binary image and extracts an object (more accurately, an image area corresponding to the object) from the binary image. In other words, the image processing unit 1 classifies the pixels constituting the high-luminance area of the binary image into lines each having a width of one pixel in the vertical direction (y direction) of the standard image and extending in the horizontal direction (x direction) thereof and converts each line to run length data including the coordinates of the position (the two-dimensional position in the standard image) and the length (the number of pixels) (step 3). Thereafter, the image processing unit 1 appends a label (identifier) to each of line groups each having overlapping in the vertical direction of the standard image among the lines represented by the run length data (step 4) and extracts each of the line groups as an object (step 5).

The object extracted by the processing of steps 3 to 5 includes not only a human being (pedestrian) but an artificial structure such as another vehicle. In addition, a plurality of local areas of an identical material body may be extracted as an object.

Subsequently, the image processing unit 1 calculates the centroid position (the position in the standard image), the area, and the aspect ratio of a circumscribing rectangle of each object extracted as described above (step 6). The area is calculated by adding up the lengths of the run length data for the same object. The coordinates of the centroid is calculated as the x coordinate of the line that bisects the area in the x direction and the y coordinate of the line that bisects it in the y direction. The aspect ratio is calculated as that of the rectangle circumscribing the run length data lines. The centroid position of the circumscribing rectangle can be substituted for the position of the centroid G.

Subsequently, the image processing unit 1 tracks the object extracted in step 5 at time intervals, that is, recognizes identical objects for each arithmetic processing period of the image processing unit 1 (step 7). In this process, assuming that an object A is extracted in the process of step 5 at time (discrete time) k in a certain arithmetic processing period and an object B is extracted in the process of step 5 at time k+1 in the next arithmetic processing period, the identity between the objects A and B is determined. The identity can be determined, for example, based on the shape and size of the objects A and B in the binary image and a correlation of the luminance distributions of the objects A and B in the standard image (grayscale image). If the objects A and B are determined to be identical to each other, the label (the label appended in step 4) of the object B extracted at time k+1 is changed to the same label as the object A.

Subsequently, the image processing unit 1 reads the outputs of the vehicle speed sensor 4 and the yaw rate sensor 3 (the detected value of the vehicle speed and that of the yaw rate) (step 8). In step 8, the angle of turn (azimuth) of the vehicle 10 is also calculated by integrating the detected value of the yaw rate having been read.

On the other hand, the image processing unit 1 performs the process of step 10 in parallel with the processes of steps 7 and 8. The processes of steps 10 to 12 are performed to calculate a distance of each object extracted in step 5 from the vehicle 10. Briefly describing the processes, the image processing unit 1 first extracts an area corresponding to each object (for example, the area of the rectangle circumscribing the object) as a target image R1 in the standard image (step 10).

Thereafter, the image processing unit 1 sets a search area R2 in the left image, as an area for use in searching for the same object as one included in the target image R1 of the right image. Furthermore, the image processing unit 1 extracts an area having the highest correlation with the target image R1 in the search area R2, as a corresponding image R3 which is the image corresponding to the target image R1 (the image equivalent to the target image R1) (step 11). In this instance, the image processing unit 1 extracts the area, having a luminance distribution most closely matching the luminance distribution of the target image R1 in the right image, as the corresponding image R3 from the search area R2 of the left image. The process of step 11 is performed not using binary images, but using grayscale images.

Subsequently, the image processing unit 1 calculates the number of pixels of a difference between the horizontal position (the position in the x direction) of the centroid of the target image R1 in the right image and the horizontal position (the position in the x direction) of the centroid of the corresponding image R3 in the left image as a parallax $\Delta d$. The image processing unit 1 calculates a distance z (the distance in the anteroposterior direction of the vehicle 10) of the object from the vehicle 10 by using the parallax $\Delta d$ (step 12). The distance z is calculated by the following equation (1):

$$z = (f \times D)/(\Delta d \times p) \qquad (1)$$

where f is the focal distance of the infrared cameras 2R and 2L, D is the base length (the distance between the optical axes) of the infrared cameras 2R and 2L, and p is a pixel pitch (the length of one pixel).

The above is the outline of the processes of steps 10 to 12. The processes of steps 10 to 12 are performed for each object extracted in step 5.

After completion of the processes of steps 8 and 12, the image processing unit 1 subsequently calculates a real space position which is the position in the real space of each object (the relative position to the vehicle 10) (step 13). The real space position is the position (X, Y, Z) in the real space coordinate system (XYZ coordinate system) set with the midpoint between the mounting positions of the infrared cameras 2R and 2L as the origin, as shown in FIG. 2. The X direction and Y direction of the real space coordinate system are the vehicle width direction and the vertical direction of the vehicle 10, respectively. The X direction and the Y direction are the same as the x direction (lateral direction) and the y direction (perpendicular direction) of the right image and the left image, respectively. The Z direction of the real space coordinate system is the anteroposterior direction of the vehicle 10. The real space position (X, Y, Z) of the object is calculated by the following equations (2), (3), and (4), respectively:

$$X = x \times z \times p/f \quad (2)$$

$$Y = y \times z \times p/f \quad (3)$$

$$Z = z \quad (4)$$

where x and y are the x coordinate and y coordinate of the object in the standard image.

Subsequently, the image processing unit 1 corrects the position X in the X direction of the real space position (X, Y, Z) of the object based on the value calculated by the above equation (2) according to the time-series data of the angle of turn calculated in step 8 in order to increase the accuracy of the real space position of the object by compensating for the effect of the change in the angle of turn of the vehicle 10 (step 14). Thereby, the real space position of the object is finally obtained. In the following description, the term "real space position of the object" means the real space position of the object corrected as described above.

Subsequently, the image processing unit 1 determines a movement vector of the object relative to the vehicle 10 (step 15). Specifically, it determines a straight line approximate to time series data over a predetermined period (a period from the current time to a time point a predetermined time period earlier) of the real space position of an identical object and then determines a vector from the position (point) of the object on the straight line at the time point the predetermined time period earlier toward the position (point) of the object on the straight line at the current time as the movement vector of the object. This movement vector is proportional to a relative speed vector of the object with respect to the vehicle 10.

Next, after determining the relative movement vector in step 15, the image processing unit 1 performs a calling attention determination process for determining the possibility of contact between the vehicle 10 and the detected object (step 16). The calling attention determination process will be described later in detail.

The image processing unit 1 restarts the processes from step 1 if it determines that no object satisfies the requirements for calling attention (there is no object fulfilling the requirements for calling attention) in the calling attention determination process in step 16 (if the determination result is NO in step 16). If it determines that any of the objects satisfies the requirements for calling attention in step 16 (if the determination result is YES in step 16), the image processing unit 1 proceeds to step 17 to perform the calling attention output determination process for determining whether to actually call attention to the object satisfying the requirements for calling attention (step 17). In this calling attention output determination process, it is checked that the driver is operating the brake of the vehicle 10 on the basis of an output of the brake sensor 5 and it is determined that the attention should not be called if the deceleration (positive in the decelerating direction of the vehicle speed) of the vehicle 10 is larger than a predetermined threshold value (>0). Unless the driver is operating the brake or if the deceleration of the vehicle 10 is equal to or lower than the predetermined threshold value though the driver is operating the brake, the image processing unit 1 determines that the attention should be called.

If the image processing unit 1 determines that the attention should be called (if the determination result is YES in step 17), it outputs information calling attention (step 18). Specifically, information calling attention with voice is output through the loudspeaker 6 and the image of the object satisfying the requirements for calling attention is displayed in a highlighted manner in the standard image on the display 7. This calls the driver's attention to the object. It is also possible to use either the loudspeaker 6 or the display 7 to call the driver's attention.

If it is determined that the attention should not be called in step 17 (if it is determined that the attention should not be called for any object), the determination result is NO in step 17. If this is the case, the image processing unit 1 directly restarts the processes from step 1.

The above is the overall operation of the vehicle surroundings monitoring apparatus according to this embodiment. The component which performs the processes of steps 1 to 6 by means of the image processing unit 1 corresponds to the object extraction process unit of the present invention, and the component which performs the process of step 12 corresponds to the distance calculation process unit of the present invention. The processes of steps 1 to 6 correspond to the object extraction step in the vehicle surroundings monitoring method according to the present invention.

Subsequently, the calling attention determination process in step 16 of the flowchart shown in FIG. 3 will be described in more detail with reference to the flowchart shown in FIG. 4. Many of the processes in the flowchart shown in FIG. 4 are the same as, for example, those in FIG. 4 disclosed in Japanese Patent Laid-Open No. 2001-6096 by the present applicant, and therefore detailed description of the same processes is omitted in this specification.

Figure 4:
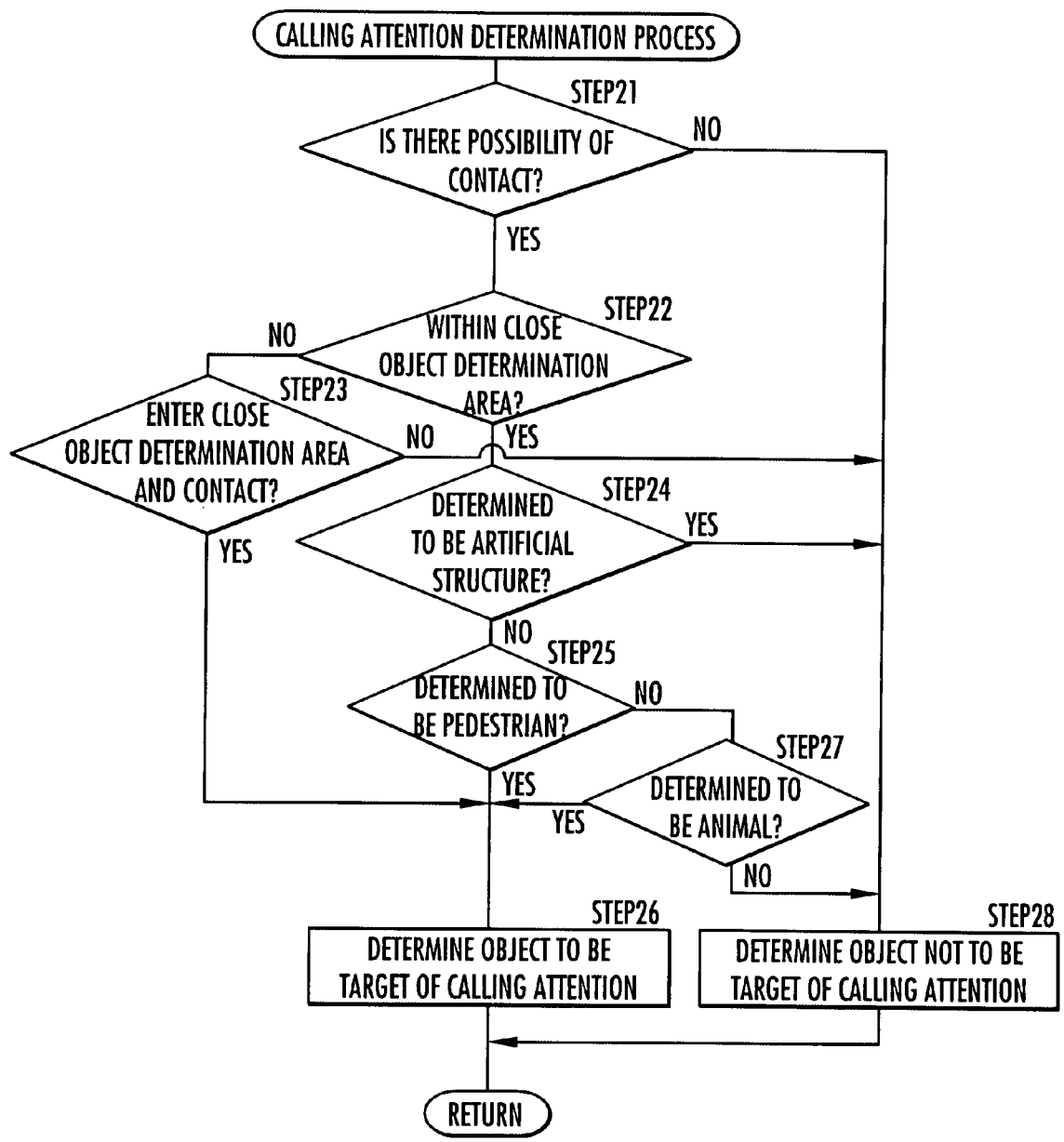
FIG. 4 is a flowchart showing the processing of the image processing unit provided in the vehicle surroundings monitoring apparatus shown in FIG. 1.

FIG. 4 is a flowchart showing the calling attention determination process operation of this embodiment. The calling attention determination process is performed to determine the possibility of contact between the vehicle 10 and a detected object through a contact determination process, a determination process for determining whether the object is within a close object determination area, an approaching object contact determination process, a pedestrian determination process, an artificial structure determination process, and an object type determination process related to the present invention described below.

First, the image processing unit 1 performs a contact determination process (step 21). The contact determination process is performed by calculating a relative speed Vs of the object with respect to the vehicle 10 in the Z direction based on the distance by which the object comes close to the vehicle 10 for a predetermined time period and determining whether there is a possibility of contact between them within a time allowed T (for example, two to five seconds) assuming that they are moving with the relative speed Vs maintained. Specifically, if the distance between the vehicle 10 and the object is equal to or less than a value obtained by multiplying the relative speed Vs by the time allowed T, the image processing unit 1 determines there is the possibility of contact between them.

Next, in step 21, if there is the possibility of contact between the vehicle 10 and the object within the time allowed T (if the determination result is YES in step 21), the control proceeds to step 22, where the image processing unit 1 determines whether the object exists within the close object determination area so as to further increase the reliability of the determination (step 22). The determination process for determining whether the object is within the close object determination area is performed by determining whether the object exists within an area corresponding to a range having a width which is equal to the vehicle width of the vehicle 10 plus allowances (for example, of the order of 50 to 100 cm) on both sides of the vehicle 10, in other words, within the close object determination area at extremely high risk of contact with the vehicle 10 if the object continues to exist there, in an area that can be monitored by the infrared cameras 2R and 2L.

Furthermore, unless the object exists within the close object determination area in step 22 (if the determination result is NO in step 22), the image processing unit 1 performs the approaching object contact determination process for determining whether there is a possibility that the object enters the close object determination area and comes in contact with the vehicle 10 (step 23). An area having X coordinates with larger absolute values than those of X coordinates of the above close object determination area (area laterally outward of the close object determination area) in the imaging area of the camera is referred to as the approaching object determination area. The approaching object contact determination process is performed by determining whether the object in this area enters the close object determination area and comes in contact with the vehicle 10 by moving. Specifically, if the movement vector (see step 15) of the object existing in the close object determination area is extended toward the vehicle 10, the image processing unit 1 determines that the object is likely to come in contact with the vehicle 10.

On the other hand, if the object exists within the close object determination area in step 22 (if the determination result is YES in step 22), the image processing unit 1 performs an artificial structure determination process for determining whether the object is an artificial structure (step 24). The artificial structure determination process is performed by determining an object to be an artificial structure and excluding the object from the targets of calling attention if a feature impossible for a pedestrian is detected in the image area of the object, for example, as described in the following conditions in (a) to (d):

The image of the object includes a portion representing a linear edge;
(b) The image of the object has a right angle;
(c) The image of the object includes the same shapes;
(d) The shape of the image of the object matches a previously registered pattern of an artificial structure.

Next in step 24, if the object is determined not to be an artificial structure (if the determination result is NO in step 24), the image processing unit 1 performs a pedestrian determination process for determining whether there is a possibility that the object is a pedestrian, in order to increase the reliability of the determination (step 25). The pedestrian determination process is performed by determining whether the object is a pedestrian based on features such as the shape, size, luminance variance or the like of the image area of the object in the grayscale image.

Furthermore, if the object is likely to enter the close object determination area and to come in contact with the vehicle 10 in step 23 (if the determination result is YES in step 23) and if the object is likely to be a pedestrian in step 25 (the determination result is YES in step 25), the image processing unit 1 determines the detected object to be a target of calling attention (step 26) and considers the determination result in step 16 shown in FIG. 3 as YES. The control then proceeds to step 17, where the image processing unit 1 performs the calling attention output determination process (step 17).

On the other hand, if the object is determined not to be a pedestrian in the above step 25 (if the determination result is NO in step 25), the object type determination process related to the present invention is performed (step 27), though the details will be described later. In the object type determination process, it is determined whether there is an animal other than a human being among the objects. If an object is determined to be an animal other than a human being as a result of the object type determination process (if the determination result is YES in step 27), the image processing unit 1 determines the detected object to be a target of calling attention (step 26) and considers the determination result in step 16 shown in FIG. 3 as YES. The control then proceeds to step 17, where the image processing unit 1 performs the calling attention output determination process (step 17).

On the other hand, if there is no possibility of contact between the vehicle 10 and the object within the time allowed T in the above step 21 (if the determination result is NO in step 21), if the object is not likely to enter the close object determination area and to come in contact with the vehicle 10 in step 23 (if the determination result is NO in step 23), if the object is determined to be an artificial structure in step 24 (if the determination result is YES in step 24), or if the object is determined not to be an animal other than a human being in step 27 (if the determination result is NO in step 27), the image processing unit 1 determines the detected object not to be a target of calling attention (step 28) and considers the determination result in step 16 as NO. The control then returns to step 1, where the image processing unit 1 repeats the detection and calling attention operation for an object such as a pedestrian or the like.

The above is the description of the calling attention determination process in step 16 of the flowchart shown in FIG. 3.

Figure 5:
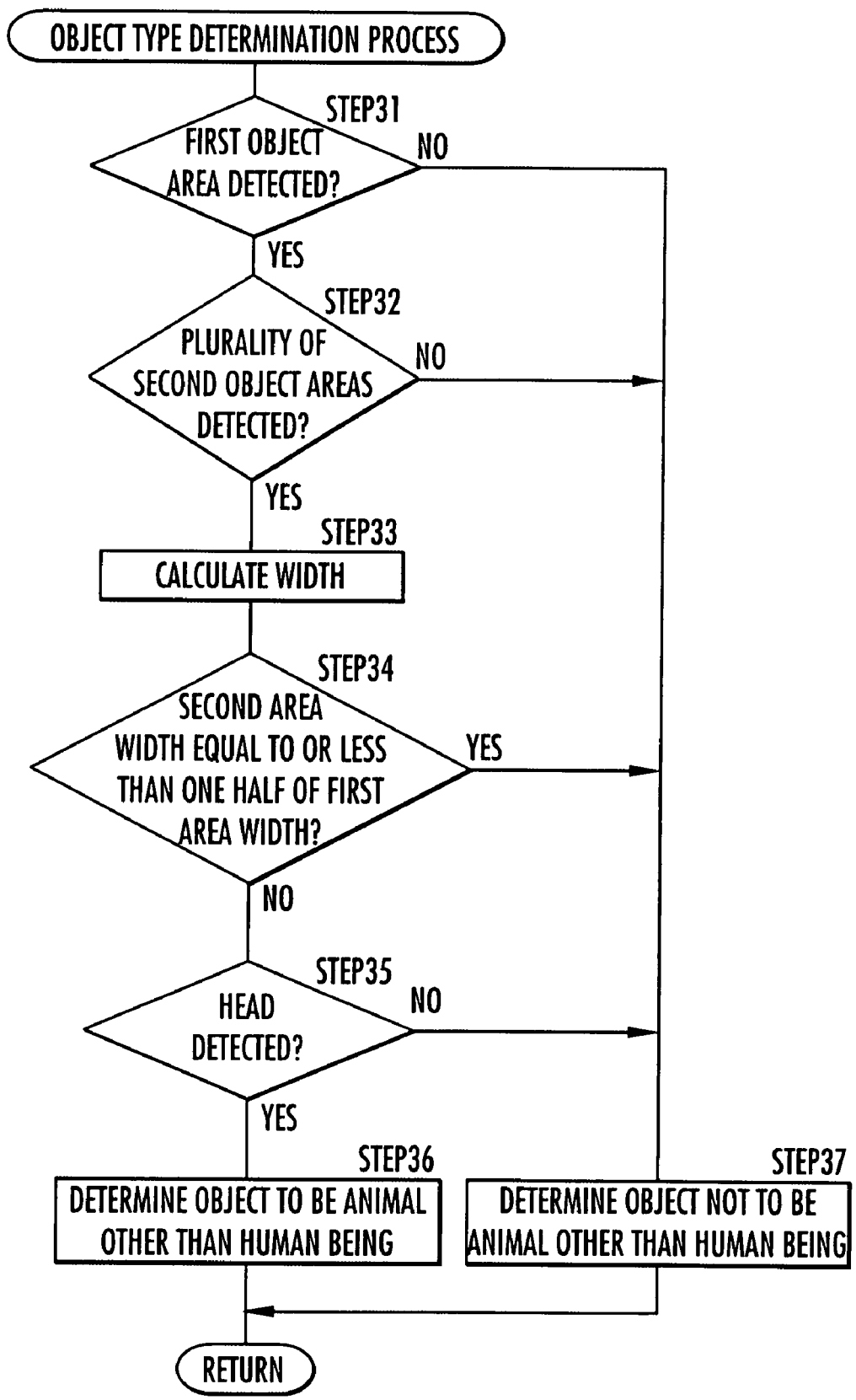
FIG. 5 is a flowchart showing an object type determination process in the embodiment.

Subsequently, the object type determination process of step 27 related to the present invention will be described with reference to the flowchart shown in FIG. 5 together with FIG. 6 and FIG. 7.

First, the image processing unit 1 detects a pattern of elliptical shape, which has a predetermined size depending on the distance between the object and the vehicle 10 and has an aspect ratio of the circumscribing rectangle within a predetermined range, as a first object area by using a known shape matching method from a binary image (see step 2) of each object determined not to be a pedestrian in the above step 25 (step 31). Note here that the elliptical shape having the aspect ratio of the circumscribing rectangle within the predetermined range corresponds to the body of a large animal such as a deer, cow, horse, or camel and the predetermined size is set as the size of the elliptical shape according to a distance between the object and the vehicle 10. Therefore, even if the external shape of the object includes an elliptical shape, a road sign not having the aspect ratio corresponding to the body of a large animal or a signboard not having the predetermined size is not detected as the first object area.

The aspect ratio of the circumscribing rectangle corresponds to "the ratio of widths in different directions" of the present invention and the directions of two sides next to each other of the circumscribing rectangle correspond to "the different directions" of the present invention.

Figure 6A:
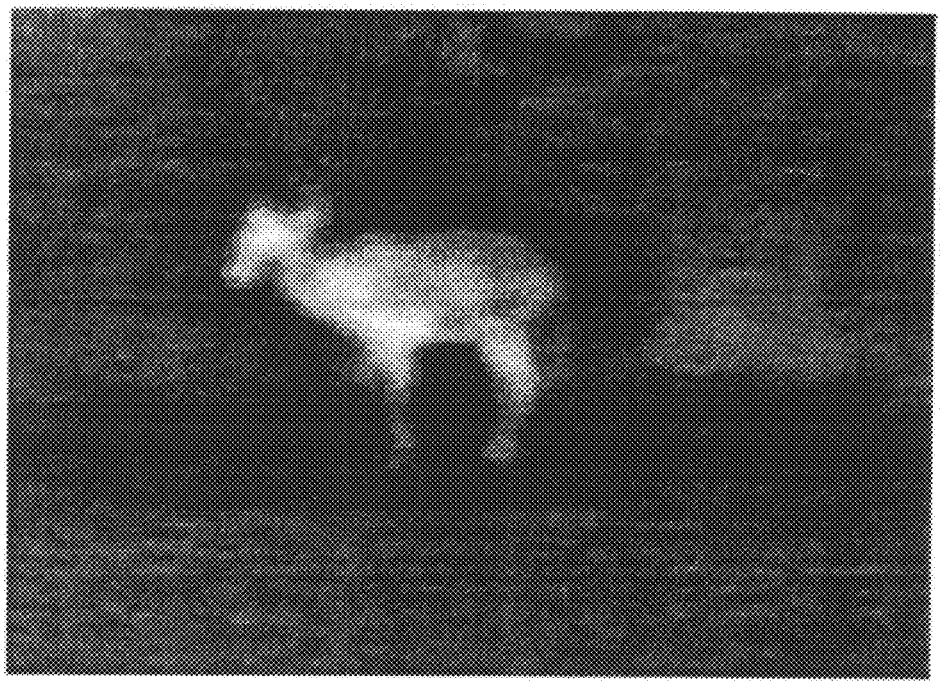
FIG. 6 is a diagram illustratively showing a captured image in the embodiment.
Figure 6B:
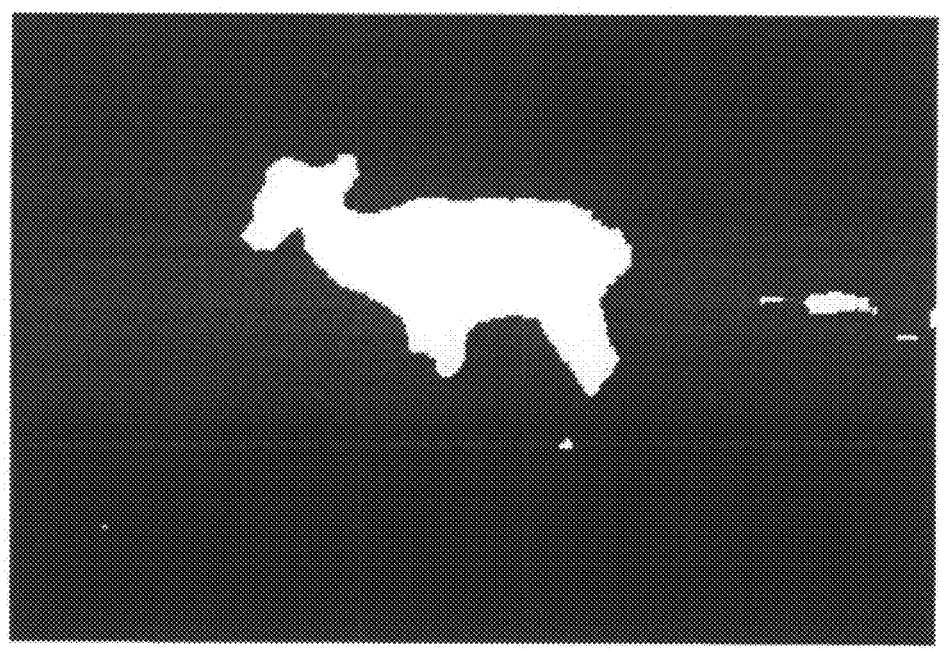

For example, if the image of a deer as shown in FIG. 6(*a*) is obtained as the captured infrared image, the binary image of the captured infrared image has the external shape shown in FIG. 6(*b*). Thereafter, an elliptical shape corresponding to the body of the animal is detected as a first object area P1 as shown in FIG. 7 from the external shape of the object in the binary image by using the shape matching method.

Although the first object area to be extracted is limited to an elliptical shape in this embodiment, the shape of the first object area is not limited thereto, but it is also possible to extract an area, which has the predetermined size depending on the distance between the object and the vehicle 10 and has the aspect ratio of the circumscribing rectangle within a predetermined range, as the first object area regardless of shape.

For example, it is possible to extract an area, which has a ratio between the horizontal width and the vertical width of the image area of the object (corresponding to "the ratio of widths in different directions" of the present invention) within the predetermined range, as the first object area.

Subsequently, if the first object area is detected in step 31 (if the determination result is YES in step 31), the control proceeds to step 32, where the image processing unit 1 detects a plurality of second object areas smaller in area than the first object area below the first object area in the binary image (step 32).

For example, in the instance shown in FIG. 7, the second object areas P2 and P3 are detected in positions below the first object area P1. Note here that the second object areas P2 and P3 can be detected as areas contiguous to the first object area P1. In order to further increase the detection accuracy, however, it is preferable to detect the second object areas P2 and P3 as ones located below the first object area P1 and at the same distance from the vehicle 10 as the first object area P1. Moreover, if the object is an animal, the shape of the second object areas is not fixed since it is detected from the left and right front and hind legs overlapping each other and moving. Furthermore, if the object is an animal, the second object areas corresponding to the legs are smaller in area than the first object area corresponding to the body of the animal. Accordingly, the image processing unit 1 does not define the shape of the second object areas P2 and P3, but defines only the surface area of the second object areas to detect them.

Subsequently, if the second object area is detected in step 32 (if the determination result is YES in step 32), the control proceeds to step 33, where the image processing unit 1 calculates a first area width, which is the horizontal width of the first object area of the object, and a second area width, which is the horizontal width between the left end on the left side and the right end on the right side of two or more second object areas (the front end of the front leg and the rear end of the hind leg) (step 33).

Figure 7:
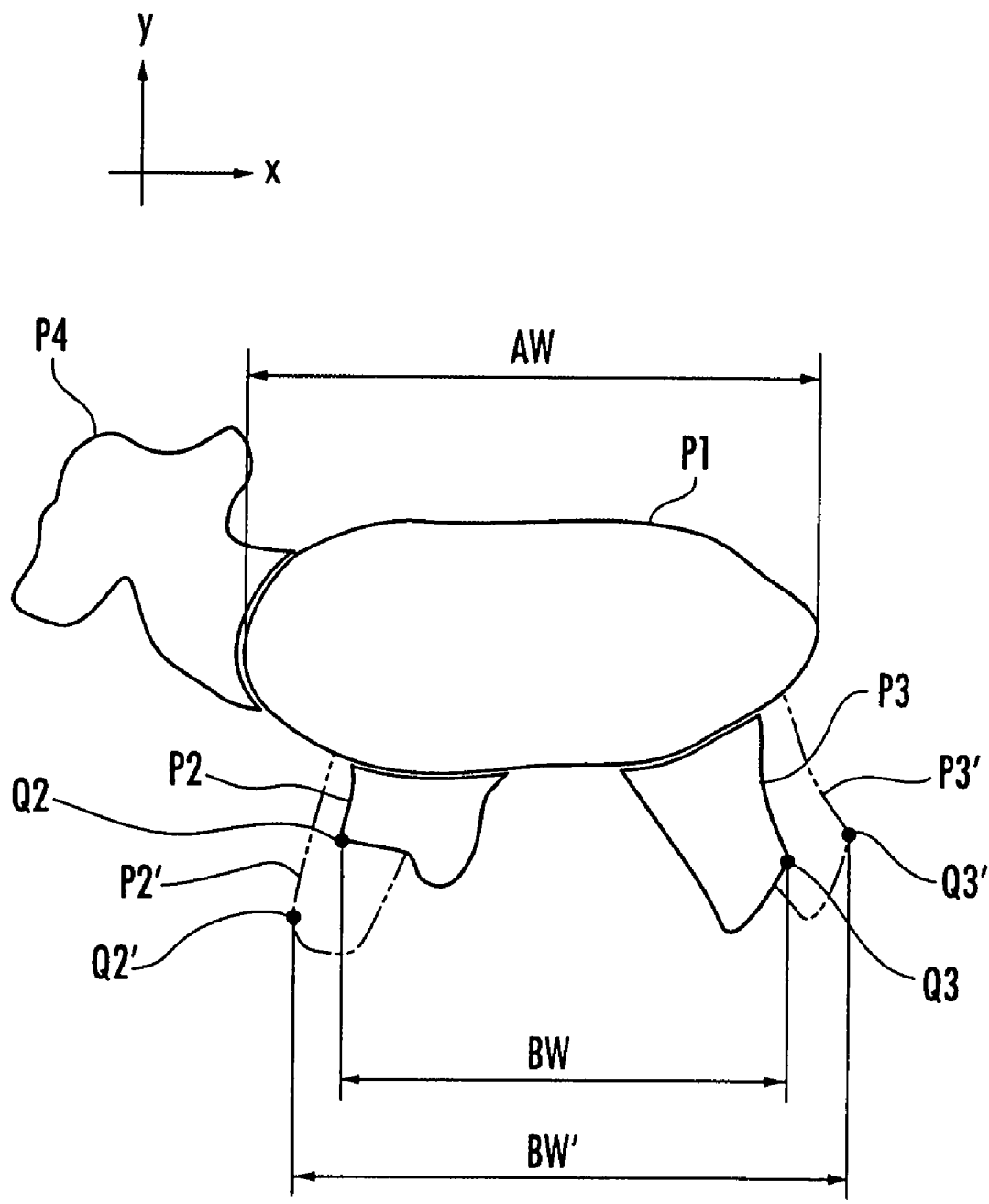
FIG. 7 is a diagram for explaining the processing of the image processing unit.

For example, in the instance shown in FIG. 7, the image processing unit 1 calculates a first area width AW, which is the horizontal (x-axis direction in FIG. 7) width of the first object area P1 in the binary image, and a second area width BW, which is the horizontal width between the left end on the left side Q2 and the right end on the right side Q3 of the second object areas P2 and P3.

In the above instance shown in FIG. 7, the second object area P2 corresponding to one front leg and the second object area P3 corresponding to one hind leg can be recognized in the image. Therefore, the second area width BW is calculated from the left end Q2 of the second object area P2 and the right end Q3 of the second object area P3. On the other hand, if the second object areas P2 and P2' corresponding to the left and right front legs are recognized, the left end Q2' of the second object area P2' corresponding to the right front leg, which is to the left (in front) of the second object area P2 corresponding to the left front leg, is considered as the left end on the left side. Similarly, if the second object areas P3 and P3' corresponding to the left and right hind legs are recognized, the right end Q3' of the second object area P3' corresponding to the right hind leg, which is to the right of (behind) the second object area P3 corresponding to the left hind leg, is considered as the right end on the right side. Thereby, the BW' is calculated as the second area width, since in this case the BW' is the horizontal width between the left end Q2' of the second object area P2' corresponding to the right front leg and the right end Q3' of the second object area P3' corresponding to the right hind leg.

Subsequently, after the first area width and the second area width between two or more second object areas are calculated in step 33, the control proceeds to step 34, where the image processing unit 1 determines whether the second area width is equal to or less than one half of the first area width (step 34).

For example, in the instance shown in FIG. 7, it is determined whether the value of BW/AW is equal to or less than one half of the first area width, where AW is the first area width and BW is the second area width in the binary image. The reason why the determination condition is the value of BW/AW equal to or less than one half is that, if the width BW of the second object area supporting the first object area is equal to or less than one half of the width AW of the first object area, it means that the second object area has an impossible relationship with the first object area as the second object area of an animal that moves while supporting the first object area corresponding to the body. Therefore, an artificial structure such as a road sign generally whose BW/AW value is equal to or less than one half is determined not to be an animal other than a human being.

Subsequently, unless the second area width is equal to or less than one half of the first area width in step 34 (if the determination result is NO in step 34) after the calculation of the first area width and the second area width between two or more second object areas, the control proceeds to step 35. Thereafter, the image processing unit 1 detects parts of the animal body each satisfying a condition of being located at the same distance from the vehicle 10 as the first object area of the object and within a predetermined range from the first object area. It then detects a part of the animal body having a predetermined size depending on the distance between the object and the vehicle 10 as a head among detected parts of the animal body (step 35). The term "predetermined size" here means a predetermined size corresponding to the head of a large animal such as a deer, cow, horse, or camel, and it is the feature condition of the present invention that the part of the animal body has the predetermined size.

For example, in the instance shown in FIG. 7, the image processing unit 1 detects an image portion P4 located within the predetermined range from the first object area P1 besides the second object areas P2 and P3. It then detect the image portion P4 as a part of the animal body if the image portion P4 is located at the same distance from the vehicle 10 as the first object area P1. Moreover, if the image portion P4 detected as a part of the animal body has the predetermined size, it detects the image portion P4 as a head.

While the existence of the head having the predetermined size is set as a feature condition for a case where the object is an animal in this embodiment, the part to be detected as a feature is not limited thereto, but it is also possible to set a feature condition corresponding to a part having a predetermined external feature (an animal's tail, the hump of a camel, or the like). For example, if the animal's tail is a feature, a part of the animal body can be detected as the animal's tail if the part of the animal body has a predetermined linear component in the vertical direction. Also, if the hump is a feature, it is possible to determine whether a part of the animal body is the hump based on the position or shape of the hump relative to the first object area.

If the head is detected from the object in step 35, the image processing unit 1 determines that the object is an animal other than a human being (step 36) and terminates the object type determination process.

On the other hand, if the first object area is not detected in the binary image in the above step 31 (if the determination result is NO in step 31), if the second object area is not detected below the first object area in step 32 (if the determination result is NO in step 32), if the second area width is equal to or less than one half of the first area width in step 34 (if the determination result is YES in step 34), or if the head is not detected in step 35 (if the determination result is NO in step 35), the image processing unit 1 determines that the object is not an animal other than a human being (step 37) and terminates the object type determination process.

The details of the object type determination process of the present invention have been described hereinabove. The component which performs the processes of steps 31 to 37 by means of the image processing unit 1 corresponds to the object type determination process unit according to the present invention. In addition, the processes of steps 31 to 37 correspond to the object type determination step in the vehicle surroundings monitoring method according to the present invention.

In the object type determination process in step 27 in this embodiment, it is determined by using the binary image whether the object is an animal other than a human being under the conditions:

The object includes a first object area of elliptical shape having the predetermined size corresponding to the body and having the aspect ratio of the circumscribing rectangle within the predetermined range (step 31);

The object includes the plurality of second object areas corresponding to the legs below the first object area (step 32); and The second area width is not equal to or less than one half of the first area width (step 34); and The object has a part of the animal body located at the same distance from the vehicle 10 as the first object area and within the predetermined range from the first object area (step 35).

The determination, however, can also be made by performing a part of the processes of the above conditions (1) to (4). For example, it can be made only under the above conditions (1) and (2). In addition, the determination can be made with the above condition (1) changed as follows: the object includes an object area of elliptical shape having the aspect ratio of the circumscribing rectangle within the predetermined range ("the predetermined size" is not included in the condition).

Furthermore, while it is determined whether the object type is an animal other than a human being in the object type determination process in step 27 in this embodiment, it is also possible to determine whether the object is any other type. For example, it is also possible to determine whether the object type is a large animal or small animal according to the size of the image area of the object. Alternatively, it is possible to determine whether the object type is a deer, cow, horse, or the like among the large animals by further identifying the shape detected from the image area of the object.

Furthermore, while the processes of steps 31 to 37 are performed by using the binary image in the object type determination process in step 27 in this embodiment, the object type determination process is not limited thereto. For example, the processes of steps 31 to 37 can be performed by using the standard image instead of the binary image so as to use a luminance variance of the standard image.

Figure 8:
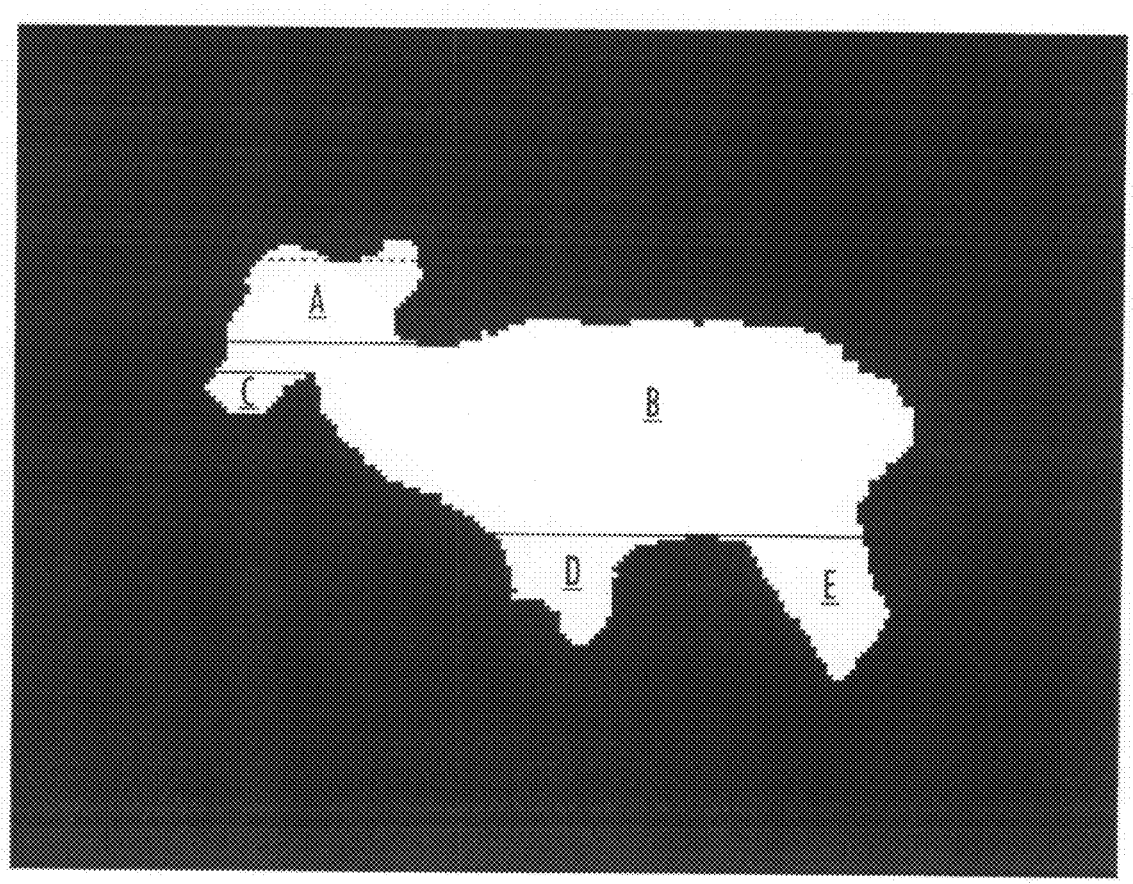
FIG. 8 is a diagram for explaining the processing of the image processing unit.

Furthermore, while the image processing unit 1 detects an elliptical pattern, which has the predetermined size corresponding to the animal body and has the aspect ratio of the circumscribing rectangle within the predetermined range, as the first object area from the external shape of the object in the binary image by using the shape matching method (step 31) in the object type determination process in step 27 in this embodiment, the object type determination process is not limited thereto. For example, if the binary image of the object shown in FIG. 8 is obtained, the binary image of the object is divided into areas so as to extract an area whose degree of change in run length is equal to or higher than a predetermined value. Thereafter, it is possible to detect an area, which has the predetermined size corresponding to the animal body and has the aspect ratio of the circumscribing rectangle within the predetermined range, as the first object area among the divided areas (A to E in FIG. 8). For example, in the instance shown in FIG. 8, the area B is extracted as the first object area. When the binary image of the object is divided, the conditions of division can be as follows: (1) the surface area of each of the divided areas is not equal to or less than a predetermined size; (2) the difference between the centroid position coordinates of the divided areas is not equal to or less than a predetermined threshold value; and (3) the difference between surface areas of the divided areas is not equal to or less than a predetermined threshold value. For example, the binary image is not divided by the dashed line in FIG. 8 because the above condition (1) of division is not satisfied.

Furthermore, while the image processing unit 1 detects a part of the animal body located at the same distance from the vehicle 10 as the first object area of the object and within the predetermined range from the first object area (step 35) in the object type determination process in step 27 in this embodiment, it is also possible to determine whether another requirement is satisfied instead of detecting a part of the animal body. For example, a vertical axis can be set in the intermediate position between the second object areas P2 and P3 corresponding to the front and hind legs to determine the symmetry between the legs P2 and P3 with respect to the vertical axis.

Furthermore, while the predetermined calling attention is performed based on the processing result of the image processing unit 1 in this embodiment, a vehicle behavior can also be controlled based on the processing result.

Furthermore, while the two infrared cameras 2R and 2L have been provided in this embodiment, the vehicle 10 can also be equipped with one infrared camera 2R or 2L with radar or the like mounted thereon to detect the distance from the object.

What is claimed is:

1. A vehicle surroundings monitoring apparatus which monitors the surroundings of a vehicle by using an image captured by a camera mounted on the vehicle, comprising:
   an object extraction process unit which extracts an image area of an object from the image captured by the camera;
   a pedestrian determination process unit which determines whether or not the object is a pedestrian based on the image area of the object extracted by the object extraction process unit; and
   an object type determination process unit for determining an object type when the object is determined not to be a pedestrian by the pedestrian determination process unit and when the image area of the object extracted by the object extraction process unit includes a horizontally long first object area in which the ratio of a horizontal width and a vertical width is within a predetermined range and a plurality of second object areas located below the first object area and smaller in area than the first object area, wherein the object type determination process unit determines that the object type is an animal other than a human being in a case where a second area width is greater than one half of a first area width and determines the object type is an artificial structure in the case where the second area width is equal to or less than one half of the first area width, wherein the first area width is the horizontal width of the first object area and the second area width is the horizontal width between the left end on the left side and the right end on the right side of the two or more second object areas.

2. A vehicle surroundings monitoring apparatus according to claim 1, further comprising a distance calculation process unit which calculates a distance of a real space position corresponding to the image area included in the image captured by the camera from the vehicle, wherein the object type determination process unit determines the object type as an animal other than a human being under the condition that the image area of the object has a feature located within a predetermined range from the first object area in the image captured by the camera and satisfying a preset feature condition and that the distance of the real space position corresponding to the feature from the vehicle is equal to the distance of the real space position corresponding to the first object area from the vehicle.

3. A vehicle surroundings monitoring apparatus which monitors the surroundings of a vehicle by using a computer which is provided in the apparatus and includes an interface circuit for use in accessing an image captured by a camera mounted on the vehicle, wherein the computer performs:
an object extraction process for extracting an image area of an object from the image captured by the camera;
a pedestrian determination process which determines whether or not the object is a pedestrian based on the image area of the object extracted by the object extraction process; and
an object type determination process for determining an object type when the object is determined not to be a pedestrian by the pedestrian determination process and when the image area of the object extracted in the object extraction process includes a horizontally long first object area in which the ratio of a horizontal width and a vertical width is within a predetermined range and a plurality of second object areas located below the first object area and smaller in area than the first object area, wherein the object type determination process determines that the object type is an animal other than a human being in a case where a second area width is greater than one half of a first area width and determines the object type is an artificial structure in the case where the second area width is equal to or less than one half of the first area width, wherein the first area width is the horizontal width of the first object area and the second area width is the horizontal width between the left end on the left side and the right end on the right side of the two or more second object areas.

4. A vehicle equipped with the vehicle surroundings monitoring apparatus according to claim 1.

5. A vehicle surroundings monitoring method of monitoring the surroundings of a vehicle by using an in-vehicle computer including a processing unit which accesses data of an image captured by a camera mounted on the vehicle, the method comprising:
an object extraction step of causing the computer to extract the image area of an object from the image captured by the camera;
a pedestrian determination step which determines whether or not the object is a pedestrian based on the image area of the object extracted by the object extraction step; and
an object type determination step of causing the computer to determine an object type when the object is determined not to be a pedestrian by the pedestrian determination process step and when the image area of the object extracted in the object extraction step includes a horizontally long first object area in which the ratio of a horizontal width and a vertical width is within a predetermined range and a plurality of second object areas located below the first object area and smaller in area than the first object area, wherein the object type determination step determines that the object type is an animal other than a human being in a case where a second area width is greater than one half of a first area width and determines the object type is an artificial structure in the case where the second area width is equal to or less than one half of the first area width, wherein the first area width is the horizontal width of the first object area and the second area width is the horizontal width between the left end on the left side and the right end on the right side of the two or more second object areas.

6. A vehicle surroundings monitoring apparatus according to claim 1, further comprising a distance calculation process unit which calculates a distance of a real space position corresponding to the image area included in the image captured by the camera from the vehicle, wherein the object type determination process unit detects as the first object area a portion of the image having a horizontal width and a vertical width within a predetermined range and having an elliptical shape with a predetermined size depending on the distance of the corresponding real space position from the vehicle.

* * * * *

UNITED STATES PATENT AND TRADEMARK OFFICE
CERTIFICATE OF CORRECTION

PATENT NO. : 7,949,151 B2  
APPLICATION NO. : 11/799963  
DATED : May 24, 2011  
INVENTOR(S) : Taniguchi et al.

Page 1 of 1

It is certified that error appears in the above-identified patent and that said Letters Patent is hereby corrected as shown below:

On the Title page:

Between Item (65) Prior Publication Data, and Item (51) Int. Cl., insert Item (30):

-- (30)     Foreign Application Priority Data

May 19, 2006     (JP)     ............................ 2006-140116 --.

Signed and Sealed this  
Twenty-seventh Day of September, 2011

David J. Kappos  
*Director of the United States Patent and Trademark Office*